United States Patent [19]
Yang

[11] Patent Number: 6,161,874
[45] Date of Patent: Dec. 19, 2000

[54] WATER SPRAY HOSE ROLLING DEVICE

[75] Inventor: Ming-Shun Yang, Taipei, Taiwan

[73] Assignee: Formosa Saint Jose Corp., Taipei, Taiwan

[21] Appl. No.: 09/283,845

[22] Filed: Apr. 1, 1999

[51] Int. Cl.$^7$ ............................................ F16L 25/00
[52] U.S. Cl. ............................ 285/12; 285/114; 285/249; 285/322
[58] Field of Search ........................... 285/12, 322, 114, 285/249; 242/395.1

[56] References Cited

U.S. PATENT DOCUMENTS

| | | | |
|---|---|---|---|
| 4,502,189 | 3/1985 | Sieberkrob et al. | 285/114 |
| 4,641,646 | 2/1987 | Schultz | 285/114 |
| 4,798,404 | 1/1989 | Iyanicki | 285/12 |
| 5,060,689 | 10/1991 | Csaszar et al. | 285/12 |
| 5,213,375 | 5/1993 | Wu | 285/322 |
| 5,655,728 | 8/1997 | Yang | 242/395.1 |

*Primary Examiner*—Eric K. Nicholson
*Attorney, Agent, or Firm*—Erik M. Arnhem

[57] ABSTRACT

A simple water spray hose rolling device includes a water spray hose, an inlet connector and a spray connector at the two ends of the water spray hose, an upper fixed base, an under fixed base, a locking ring, and an elastic connection between the two bases. Edge strips at two sides of the water spray hose are enclosed by two semicircular splints in the interior of the inlet connector to affix the water spray hose to the inlet connector. The two fixed bases include two symmetrical T-shape clamping plates connected by an elastic connector. Through the fillister formed between the two T-shape clamping plates, the water spray hose of this invention can be rolled up and stored.

7 Claims, 10 Drawing Sheets

WATER SPRAY HOSE ROLLING DEVICE

BACKGROUND OF THE INVENTION

When people water the garden or wash cars by using a rubber hose, they connect one end of the inlet connector of the rubber hose with the tap, so that water will flow out from the other end of the spray connector of the rubber hose. But after using, the scattered hose is not easy to tidy up and store. Recently, there has been proposed a flat water spray hose, having reduced volume in the flat condition. However, this does not reduce the length of the rubber hose. Therefore, the long water spray hose is still not easy to tidy up and store.

Figure 1:
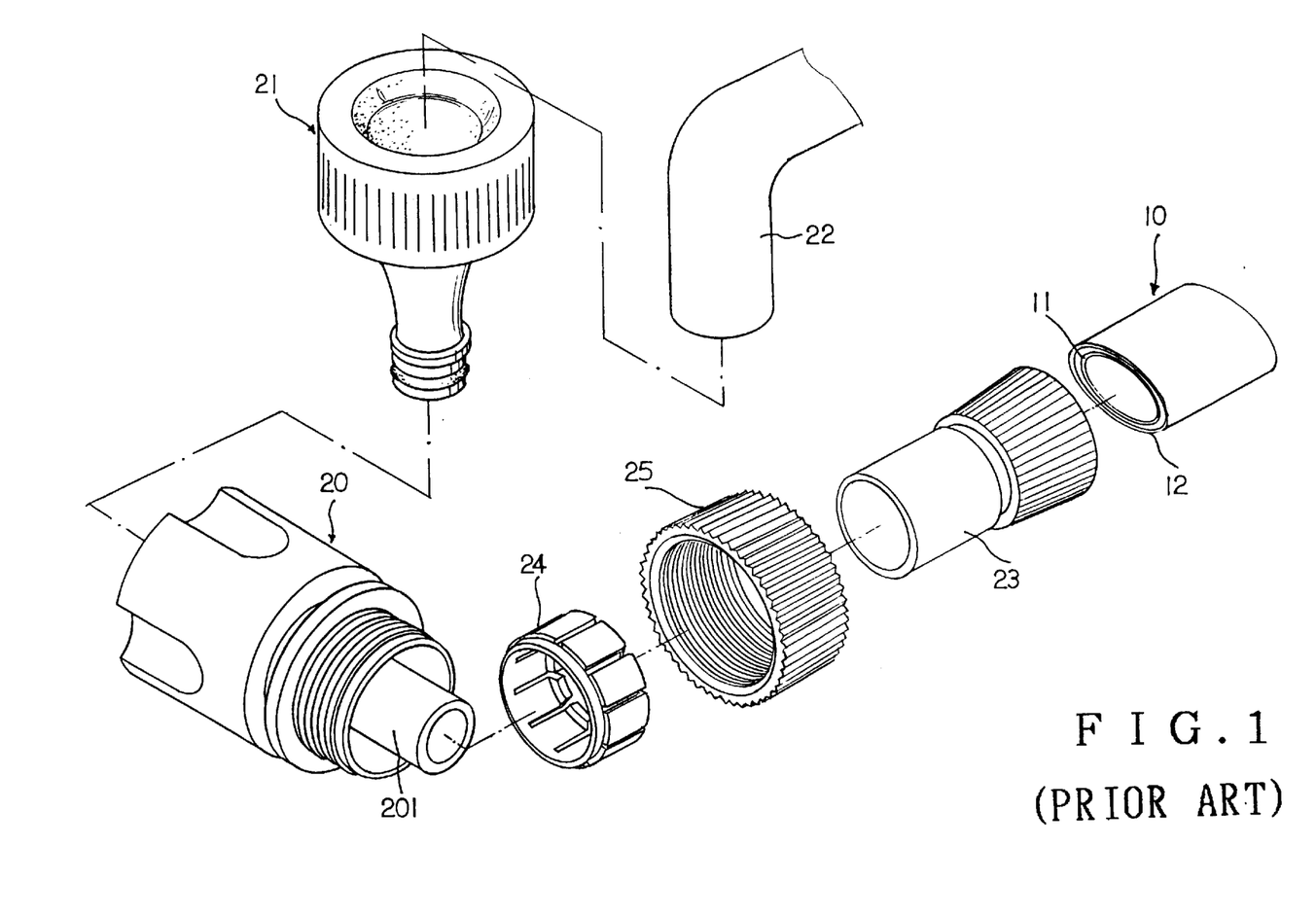
FIG. 1 is a breakdown view of the conventional flat water spray hose (10) and conventional inlet connector (20).

As shown in FIG. 1, the two ends of a conventional flat water spray hose (10) are connected to an inlet connector (20) and a spray connector (not shown in FIG. 1) separately. The inlet connector (20) is connected with the tap (22) by an adapter (21), so that the water can spray out the spray connector at the other end of the water spray hose (10). The connection of the flat water spray hose (10) and the inlet connector (20) is accomplished by inserting the end of the water spray hose (10) through the holding casing pipe (23), and then connected tightly with a cylindrical spray nozzle (201). Then the shell toggle (24) and a screw collar (25) are used outside of the holding casing pipe (23) to connect the water spray hose (10) to inlet connector (20). However, the shell toggle (24) can not fix the water spray hose (10) strongly. When the water pressure is too strong, the water spray hose (10) will separate from the inlet connector (20). This is defect of the conventional inlet connector (20).

Figure 2:
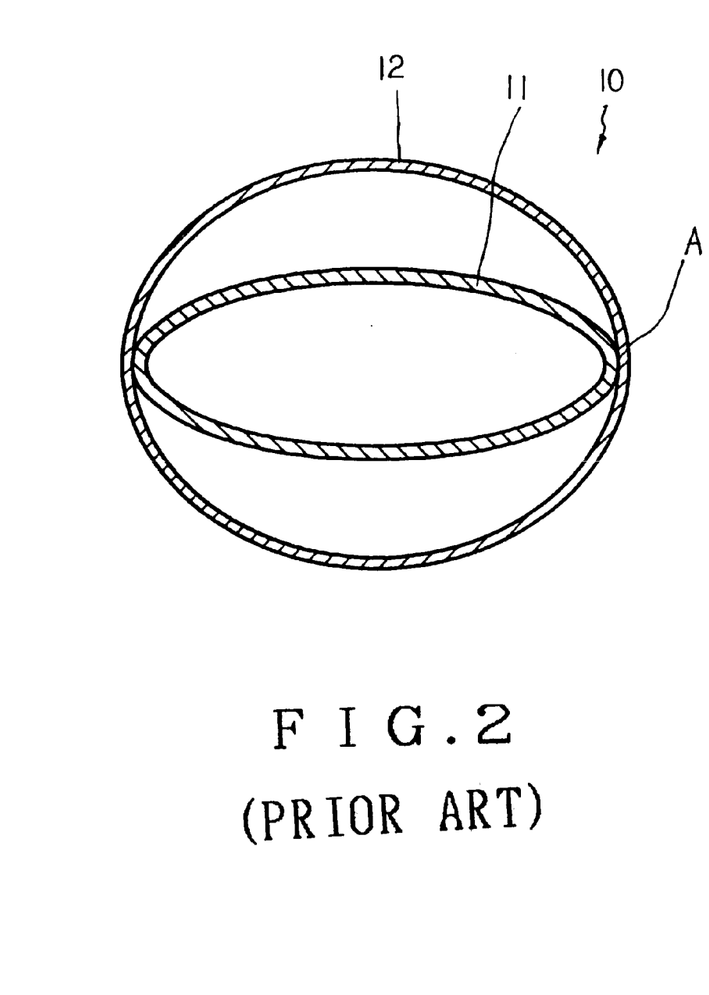
FIG. 2 is a sectional view of the inner rubber hose (11) and the outer nylon fiber hose (12) of the water spray hose (10).
Figure 3:
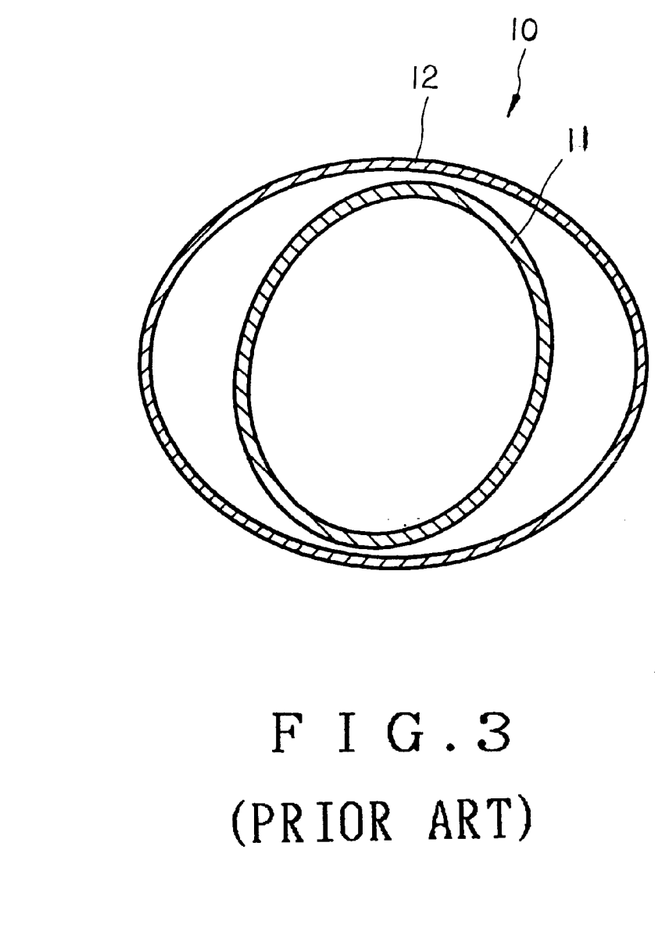
FIG. 3 is an optional view to show the inner rubber hose (11) and the outer nylon fiber hose (12) of the water spray hose (10) will be deformed and displaced.

In addition, FIGS. 1, 2 and 3 show a further problem with a conventional flat water spray hose (10). The two flat folding points (A) at the two edges of the inner rubber hose (11) and the outer nylon fiber hose (12) are not stable. After numerous rolling of the water spray hose (10), the inner hose (11) and the outer hose (12) will be deformed and displaced to the configuration shown in FIG. 3. This not only causes the water spray hose (10) to unwind when rolling, but also damages the water spray hose (10) because the residual water in the hose can not be squeezed out and the foul water corrodes the interior of the hose. This is a drawback of the conventional flat water spray hose (10).

Because of the defective design on the conventional flat water spray hose (10) and the conventional inlet connector (20), the inventor devised an improved foldable flat hose, as shown and described in a U.S. Pat. application Ser. No. 09/092,302 titled An Improved Structure of a Water Spray Hose Device, filing date Jun. 5, 1998.

However, the inventor found that there are different caliber outdoor taps in different countries. In order to match different sizes of caliber, differently sized inlet connectors and parts are necessary. This increased cost is very inconvenient. Because the water pressure in Europe and America are stronger than in Asia, the outdoor taps in Europe and America are threaded. The inlet connectors used in these areas are internally threaded to fix the inlet connector with the outdoor tap and to avoid the inlet connector being separated from the tap because of the strong water pressure. But the threaded inlet connector used in Europe and America can not be used in Asia, because the inlet connector used in Asia is not threaded. Therefore, the manufacturer needs to supply the different areas inlet connectors with different sizes, with or without threads. This will increase the manufacturing cost, and this is why the inventor provides the present invention to improve the above situation. By this invention, the user can not only conveniently tidy up and store the water spray hose, but also the inlet connector can be used on any size tap, whether the tap is threaded or unthreaded. It increases the practicability and convenience of the water spray hose.

DETAILED DESCRIPTION

Figure 4:
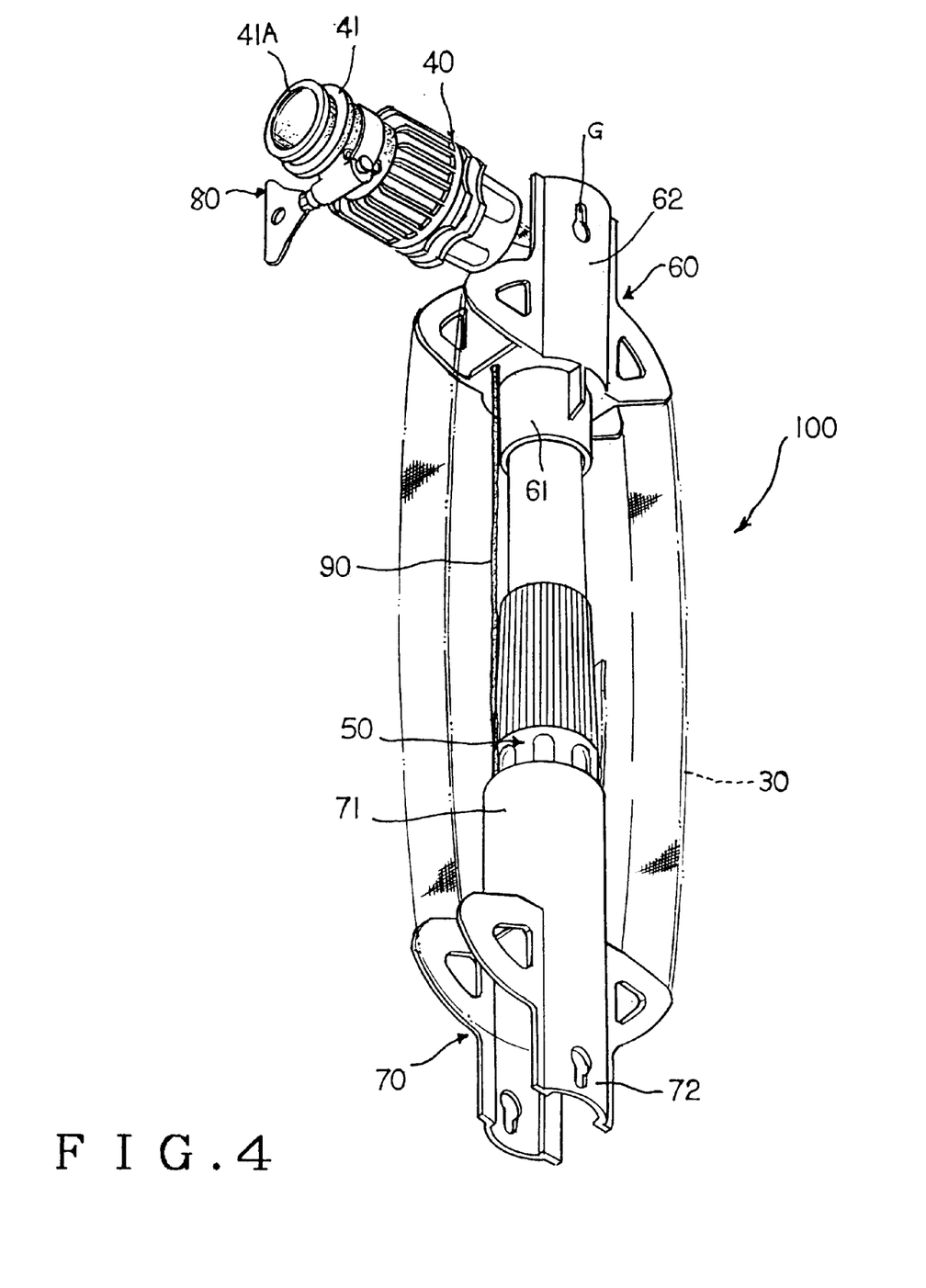
FIG. 4 is an appearance view of the rolling device (100) of this invention.
Figure 5:
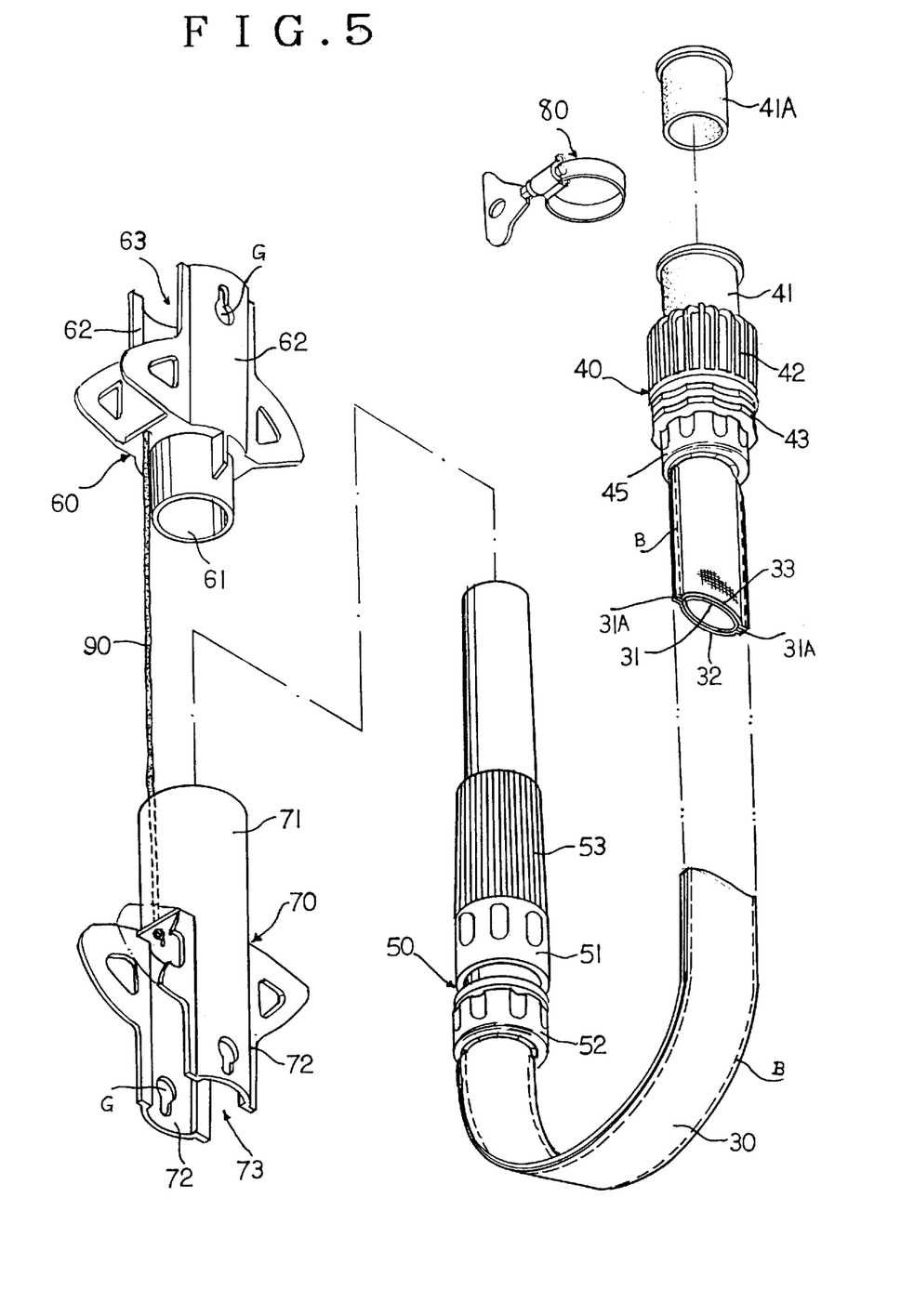
FIG. 5 is a breakdown view of the rolling device of this invention.
Figure 6:
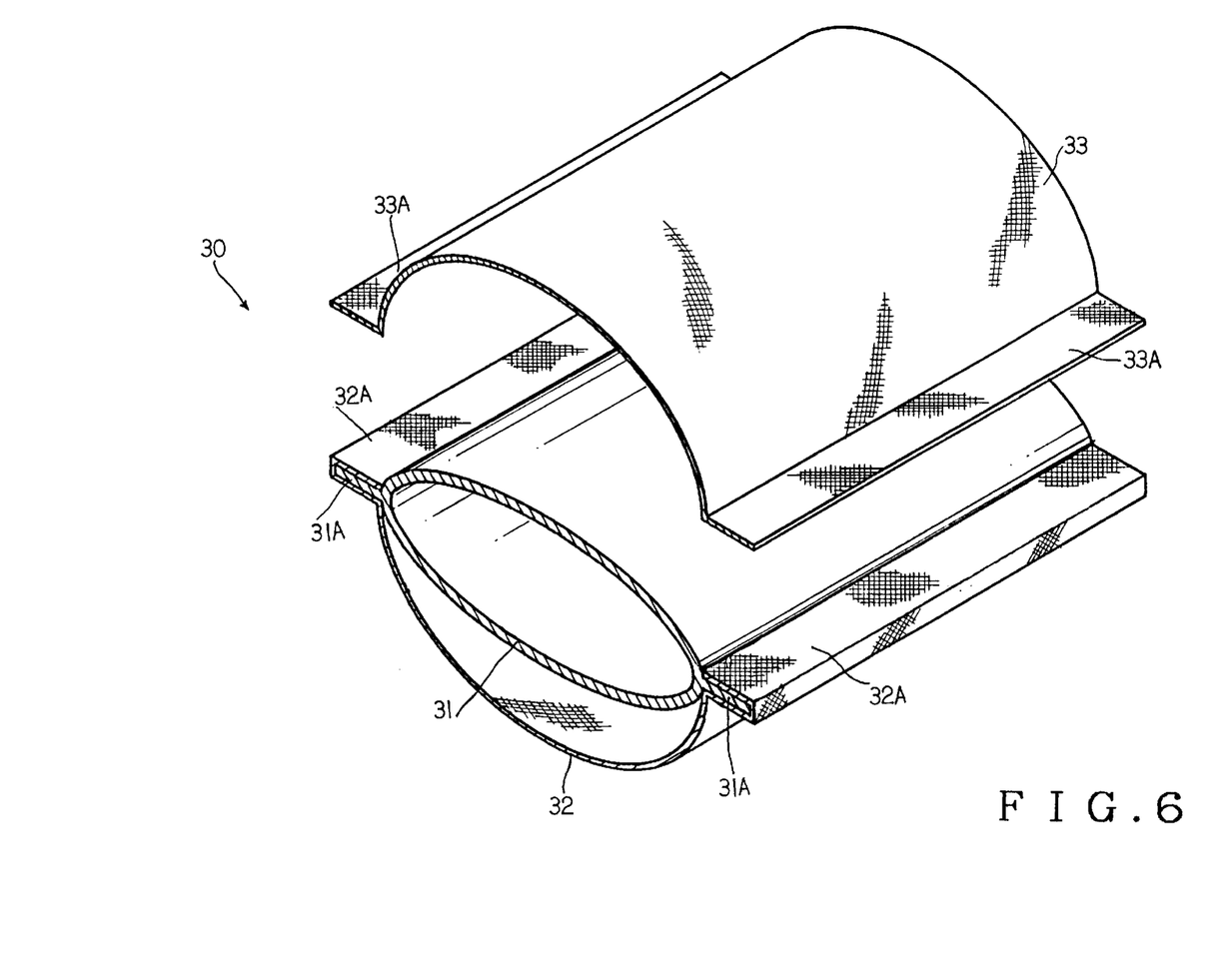
FIGS. 6 and 7 are breakdown view and sectional view of the water spray hose (30) of this invention.

Referring to FIGS. 4, 5, and 6, a simple water spray hose rolling device (100) includes a foldable water spray hose (30), two connectors—an inlet connector (40) and a spray connector (50) at two ends of the water spray hose (30), an upper fixed base (60), an under fixed base (70), a locking ring (80), and an elastic suspension means (90).

Figure 7:
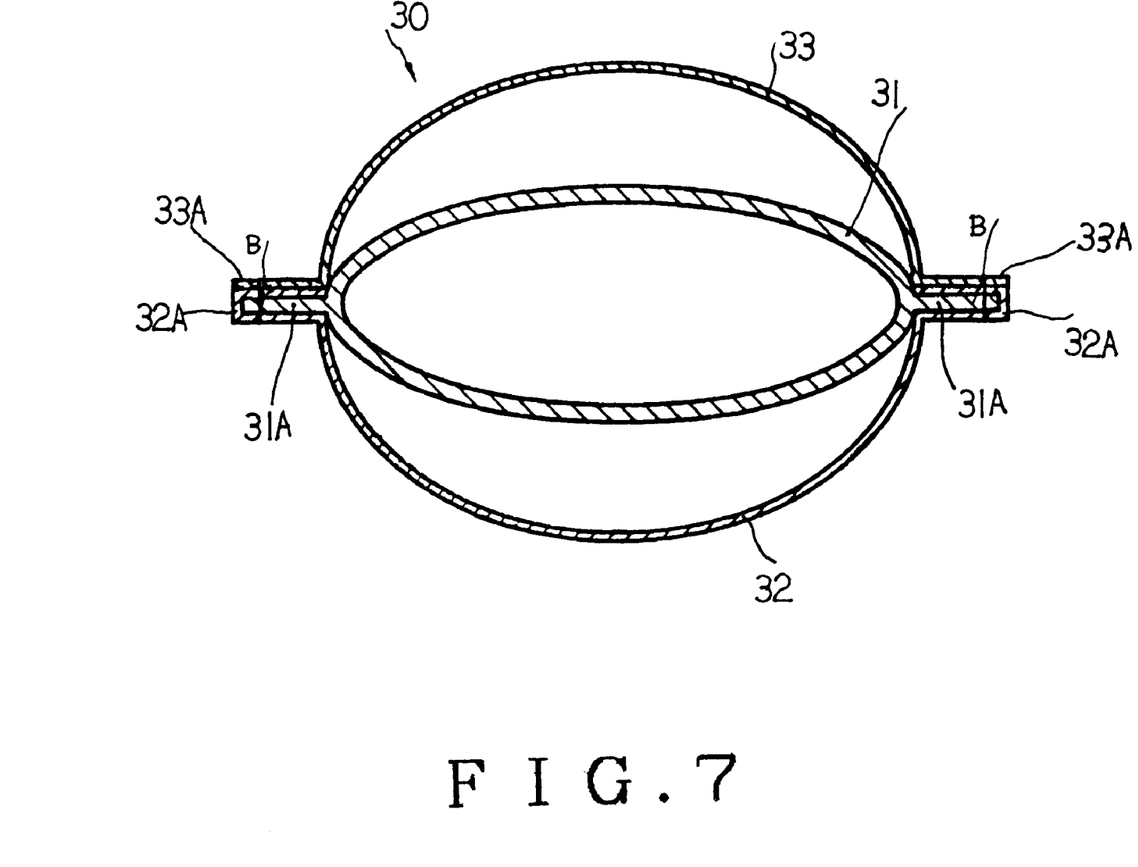

Referring to FIGS. 5, 6, and 7, a water spray hose (30) of the present invention consists of an elliptical rubber hose (31), a first nylon fiber layer (32), and a second nylon fiber layer (33). Edge strips (31A) at two sides of the rubber hose (31) are covered with concave edges (32A) of the first nylon fiber layer (32), and the concave edges (32A) are covered with the extended edges (33A) of the second nylon fiber layer (33). The rubber hose (31) is wrapped up with the nylon fiber layers (32) and (33), then sewing (B) the edge strips (31A) of the rubber hose (31), concave edges (32A) of the first nylon fiber layer (32), and the extended edges (33A) of the second nylon fiber layer (33) together to form a water spray hose (30).

Figure 8:
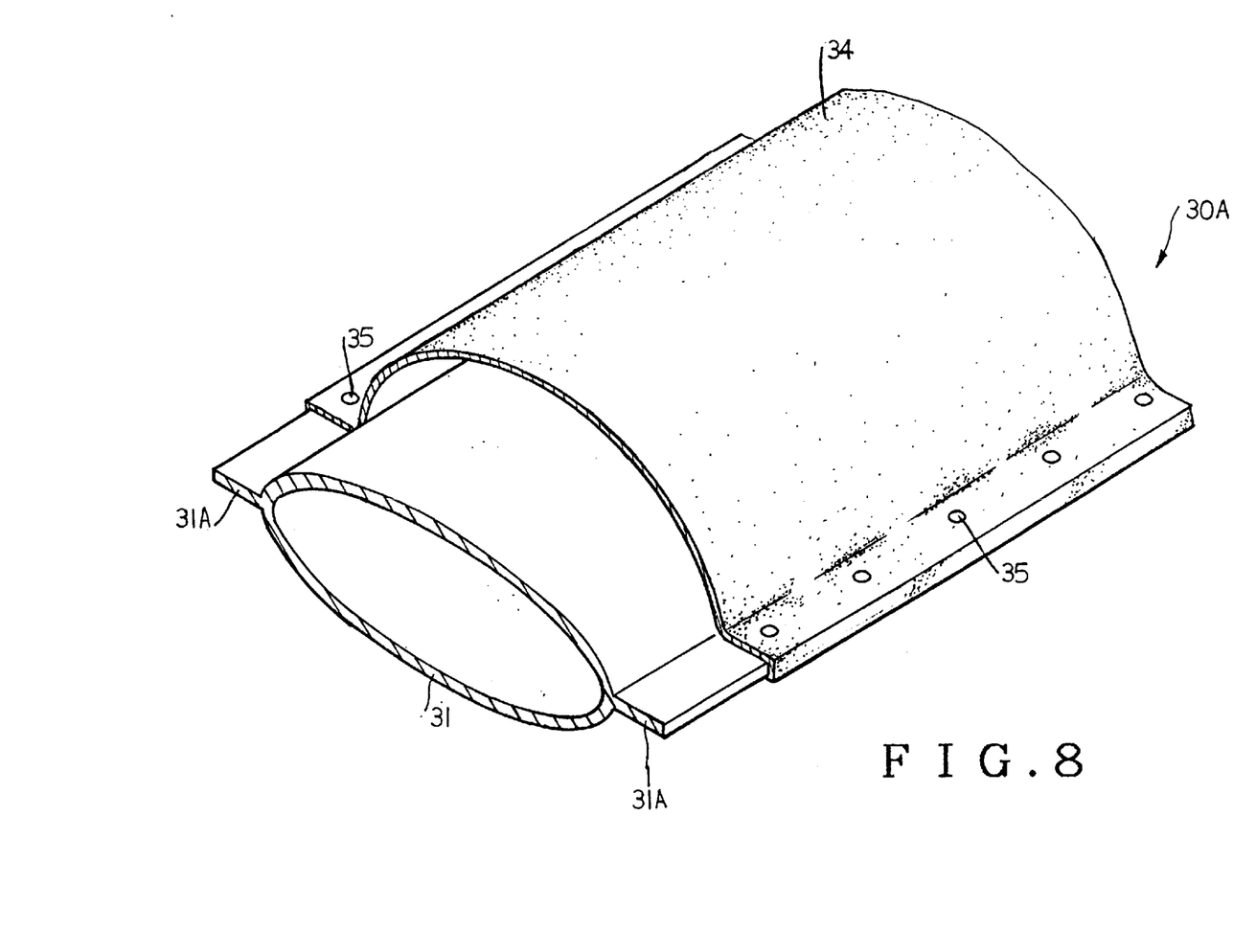
FIG. 8 is a sectional view of the other type of the water spray hose (30A) of this invention.

FIG. 8 shows another design of the water spray hose (30A), which includes an inner elliptical rubber hose (31) with edge strips (31A) at two sides, and a outer hollow nylon fiber hose (34). To connect and fix the rubber hose (31) and the nylon fiber hose (34), the two sides of the nylon fiber hose (34) are wrapped up with the two edge strips of the rubber hose (31), then welded ultrasonically at about five centimeters intervals. Multiple symmetrical welds (35) will be formed on the water spray hose (30A). The rubber hose (31) and the nylon fiber hose (34) will be fixed and connected in whole.

Referring to FIGS. 4, 5, 9, and 10, the inlet connector (40) consists of a rubber bushing (41), an outer screw collar (42), a primary connector (43), two semicircular splints (44), and a screw collar (45).

Figure 9:
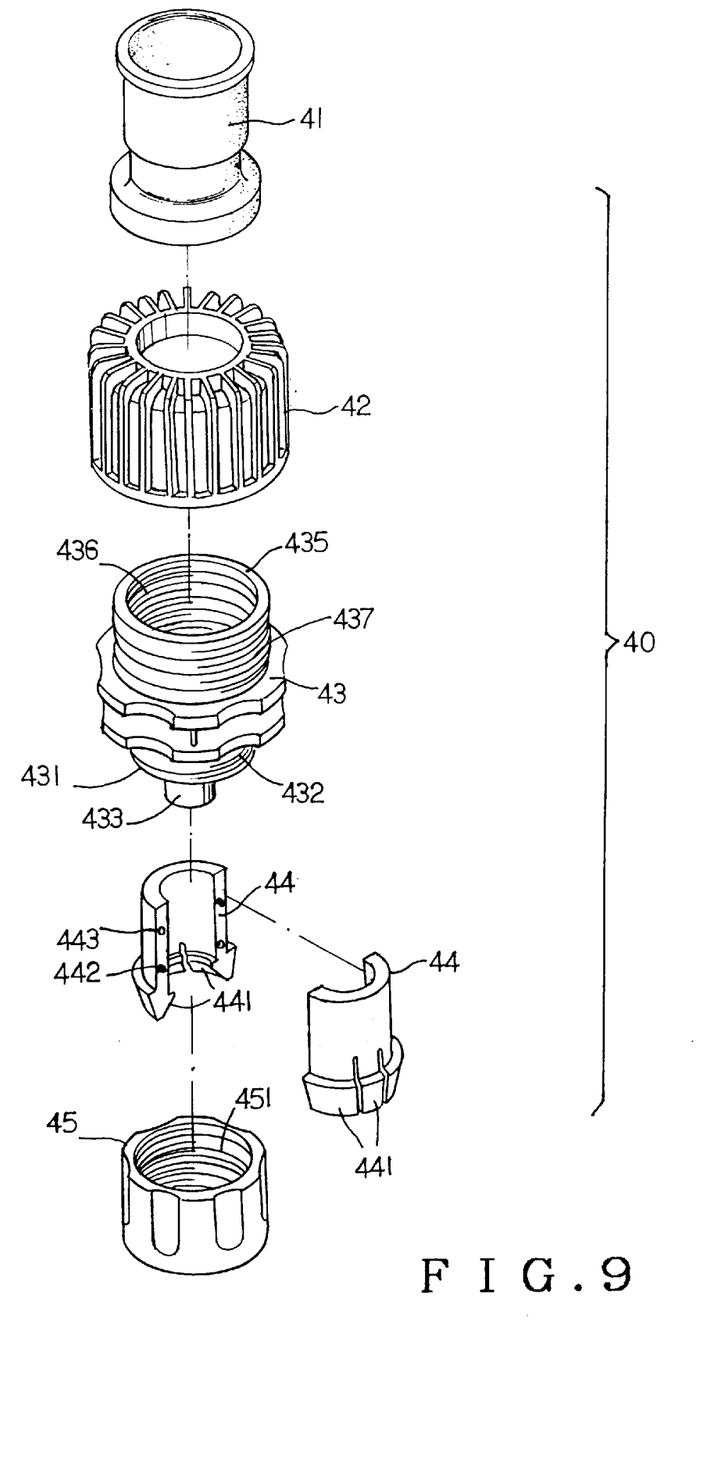
FIG. 9 is a breakdown view of the inlet connector (40) of this invention.
Figure 10:
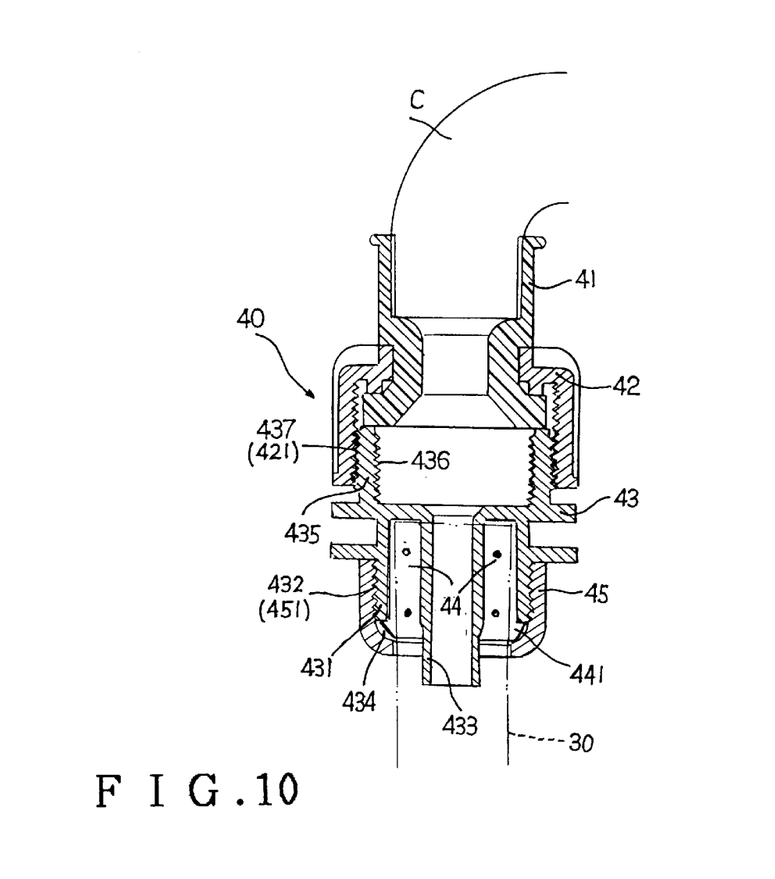
FIG. 10 is a sectional view to show the inlet connector used in a smooth surfaced big caliber tap (C).

There is a threaded tube (431) at one end of the primary connector (43), having an outer thread (432), which meshes with the inner thread (451) of the screw collar (45) to screw the collar (45) and the primary connector (43) together. A spray nozzle (433) located concentrically within threaded tube (431) is inserted into the end of the water spray hose (30) to interconnect the water spray hose (30) and the primary connector (43). The residual space around the spray nozzle (433) forms a circle fillister (434) for receiving two semicircular splints (44) of this invention.

The two semicircular splints (44) have several juxtaposed elastic shells (441). When the two semicircular splints are combined around the hose the elastic shells (441) will wrap up the water spray hose (30) tightly. At each of the facing edges of the semicircular splints there is a tapering tack-shape part (442) and a hole (443). The tapering tack-shape part (442) and the hole (443) are aligned to each other for wedging each tapering tack-shape part (442) toward an aligned hole (443), to exert a backing force on each edge (31A) of the water hose.

When the spray nozzle (433) of the primary connector (43) is inserted into the water spray hose (30) of this invention, two semicircular splints (44) encircle the water spray hose (30). The tapering tack-shape part (442) on the semicircular splints (44) will grip and fix the edge strips (31A) which are set at two sides of the water spray hose (30); the edge strips (31A) are wedged into the holes (443). The water spray hose (30) and the two semicircular splints (44) will grip and lock together strongly. After putting the two semicircular splints (44) into the aforesaid circle fillister (434) the collar (45) is screwed onto the primary connector (43). The multiple elastic shells (441) at the ends of the aforesaid two semicircular splints (44) will jut out of the opening of the screw collar (45) to fasten the water spray hose (30) to nozzle 433.

Referring to FIGS. 9 and 10, there is a threaded tube (435) at the other end of the primary connector (43). Tube 435 has an inner thread (436) and outer thread (437). The outer thread (437) is screwed tightly with the inner thread (421) of the outer screw collar (42).

The aforesaid big rubber bushing (41) is used for the big smooth surfaced caliber tap (C) in Asia. When the big rubber bushing (41) is inserted into the outer screw collar (42), the outer screw collar (42) will be fixed with connected threaded hose (435), and the jutted big rubber bushing (41) can be connected with the big caliber tap.

Figure 11:
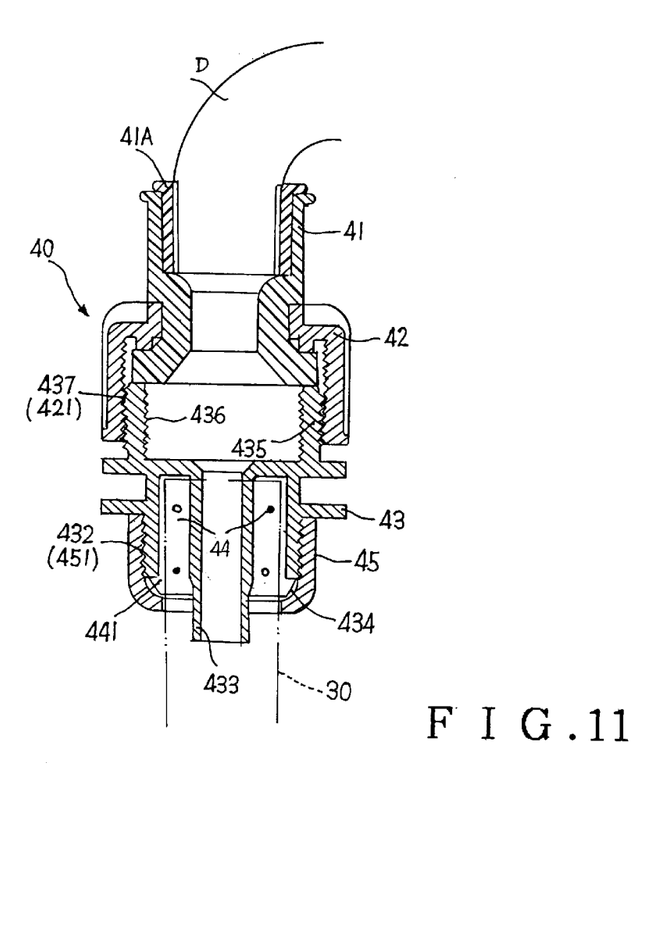
FIG. 11 is a sectional view to show the inlet connector used in a smooth surfaced small caliber tap (D).

Referring to FIGS. 5 and 11, when the inlet connector (40) of this invention is used for the smooth surfaced small caliber tap (D) in Asia, the user can insert the small rubber sleeve (41A) of this invention into the big rubber bushing (41), and lock it by the locking ring (80).

Figure 12:
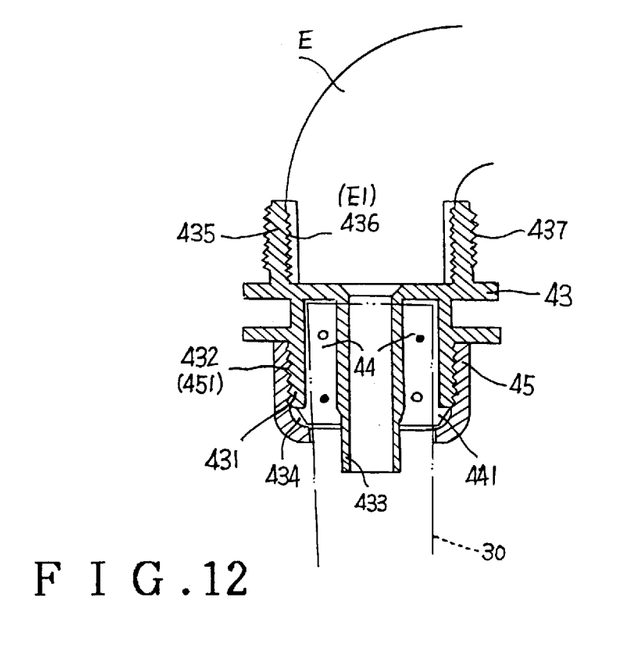
FIG. 12 is a sectional view to show the inlet connector used in an externally threaded big caliber tap (E).

Referring to FIGS. 9 and 12, when the inlet connector (40) of this invention is used for the externally threaded big caliber tap (E) in Europe and America, the user just needs to omit the big rubber bushing (41) and outer screw collar (42) and connect the primary connector (43) with the externally big caliber tap (E). The inner thread (436) of the connected threaded tube (435) of the primary connector (43) can mesh with the outer thread (El) of the big caliber tap tightly.

Figure 13:
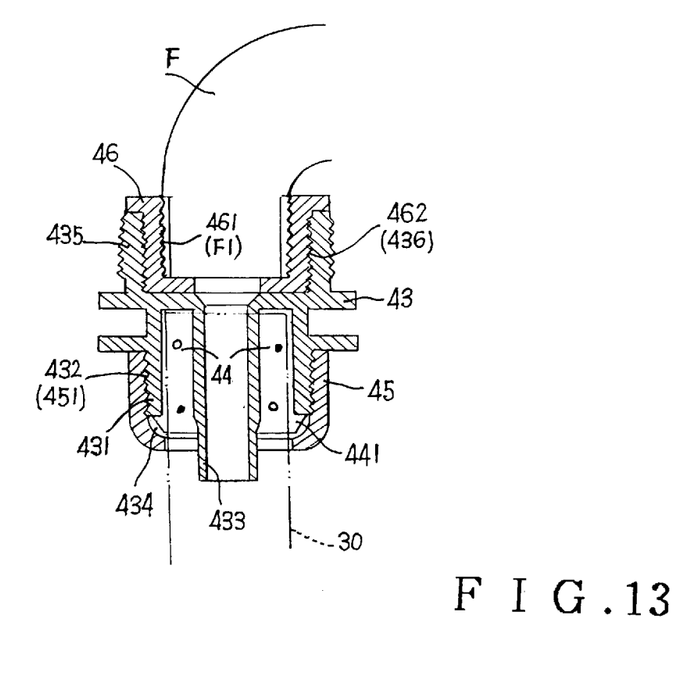
FIG. 13 is a sectional view to show the inlet connector used in an externally threaded small caliber tap (F).

Referring to FIGS. 9 and 13, a threaded insert 46 can be interposed between threaded tube 435 and a small caliber tap F, to form a connection between the tap and primary connector 43. The inner thread (461) of the threaded insert (46) can be screwed tightly with the externally threaded surface Fl of the small caliber tap (F) in Europe and America.

Referring to FIGS. 4 and 5, the spray connector (50) at the other end of the water spray hose (30) consists of a primary connector (51) (as shown in FIG. 1), two semicircular splints (as shown in FIG. 9), a screw collar (52), and a conventional sprinkler (53). The connection of the water spray hose (30) with the primary connector (51) is the same as with the aforesaid inlet connector (40).

Referring to FIGS. 4 and 5, a small cylinder (61) at the bottom of the upper fixed base (60) is adapted to receive the sprinkler (53) of the spray connector (50). There are two T-shape clamping plates or walls (62) at the top of the upper fixed base (60). The two T-shape clamping plates (62) are symmetrical, and there is a fillister (63) formed between the two T-shape clamping plates (62) for rolling and storing the water spray hose (30) of this invention.

As shown in FIGS. 4 and 5, a big cylinder (71) at the top of the under fixed base (70) is adapted to receive the primary connector (51) of the spray connector (50). There are two T-shape clamping plates or walls (72) at the bottom of the under fixed base (70). The two T-shape clamping plates (72) are symmetrical, and there is a fillister (73) formed between the two T-shape clamping plates (72) for rolling and storing the water spray hose (30) of this invention.

As shown in FIGS. 4 and 5, one end of an elastic connector (90) is fixed on the outer wall of the small cylinder (61) of the upper fixed base (60). The other end of the elastic connector (90) is fixed on the outer wall of the big cylinder (71) of the under fixed base (70) for connecting the upper fixed base (60) and the under fixed base (70).

When operating the rolling device (100) of this invention, the first step is to insert the primary connector (51) of the spray connector (50) into the big cylinder (71) of the under fixed base (70), and then insert the sprinkler (53) of the spray connector (.50) into the small cylinder (61) of the upper fixed base (60). The folded water spray hose (30) can be wound within the fillister (63) of the upper fixed base (60) and the fillister (73) of the under fixed base (70). After winding, the inlet connector (40) is wedged between the two T-shape clamping plates (62) of the upper fixed base (60), and the rolling device (100) is hung on the wall by the hole (G) formed on the clamping plates (62) and (72) of the two fixed bases (60) and (70).

From the above description, the water spray hose rolling device according to the present invention is novel in design and practical for use, and is therefore better and largely improved than the conventional water spray hose device.

I claim:

1. In combination: a transeversely foldable water hose assembly that includes an inner elliptical rubber hose (31) having two diammetrically spaced edge strips (31A) located on the major axis of the ellipse to define the hose fold plane, a first fiber covering (32) extending along one half of the elliptical hose, and a second fiber covering (33) extending along the other half of the elliptical hose;

said hose assembly having a first end and a second end;

means for connecting the first end of said foldable hose assembly to a cylindrical tap (22), wherein the tap can have varying diameters and surface characteristics that include a threaded surface and a smooth unthreaded surface;

said connecting means comprising a primary connector (43) having a first externally threaded tube (435) extending in one direction, a second externally threaded tube (431) extending in the opposite direction, and a cylindrical nozzle (433) located within said second tube to telescopically fit into the first end of said water hose assembly, means for fastening said first tube (435) to any one of the aforementioned cylindrical taps, two semi-circular splints (44) encircling the first end of the water hose assembly within said second tube so that the aforementioned edge strips (31A) fit between facing edge surfaces of the splints, and a collar (45) threaded onto said second tube to exert pressure on said splints for establishing a fluid-tight seal between the hose assembly and said nozzle; and real means for storing the water hose assembly in a rolled-up condition, said reel means comprising an upper base 60, a lower base 70, and elastic means 90 suspending the lower base from the upper base; said upper base and said lower base each having two parallel walls (62 and 72) for retaining the hose assembly in a rolled-up condition; said upper base and said lower base having aligned hollow cylinders (61,71) for accommodating the second end of the water hose assembly when the hose assembly is in a rolled-up condition.

2. The combination of claim 1, wherein said fastening means comprises a rubber bushing (41) secured to said first tube, and a locking clamp (80) encircling said bushing to clamp said bushing to a smooth surfaced tap.

3. The combination of claim 2, wherein said fastening means further includes a second collar (42) threaded onto said first tube for securing the rubber bushing to the second tube.

4. The combination of claim 2, and further comprising a rubber sleeve (41A) telescopically fitting within the bushing to accommodate a reduced diameter tap.

5. The combination of claim 1, wherein said fastening means comprises an internal thread on said first tube, whereby the first tube can be fastened to an externally threaded tap.

6. The combination of claim 1, wherein said fastening means comprises an internally threaded annular insert (46) threaded into said first tube to form a threaded mounting surface for an externally threaded tap.

7. The combination of claim 1, wherein said splints include deflectable shells (441); said collar having an inturned flange that deflects said shells toward said nozzle when the collar is screwed onto said second tube, whereby the hose assembly is clamped to the nozzle.

\* \* \* \* \*